Dec. 26, 1933.   E. L. BOWLES   1,941,385
ACOUSTIC SYSTEM
Filed Oct. 12, 1929

Inventor
Edward L. Bowles
by David Rines
Attorney

Patented Dec. 26, 1933

1,941,385

UNITED STATES PATENT OFFICE 1,941,385

ACOUSTIC SYSTEM

Edward Lindley Bowles, Wellesley Farms, Mass.

Application October 12, 1929. Serial No. 399,361

13 Claims. (Cl. 178—44)

The present invention relates to acoustic-electric systems, and its chief object is to increase highly, for predetermined frequencies, the selectivity and sensitivity of the diaphragms or similar sound-energy-receiving parts of acoustic-electric pick-up systems. Other objects will be explained hereinafter, and will be particularly pointed out in the appended claims.

A feature of the invention contemplates reducing the acoustic resistance or impedance of the diaphragm to a zero value, or to a very small value, preferably by associating the diaphragm with a vacuum-tube regenerative circuit element through an acoustic-electric circuit element capable of converting electric energy into acoustic energy, and vice versa. The diaphragm being thus highly tuned at a single frequency by virtue of the regenerative electric circuit element associated therewith, it is highly selective and sensitive. The invention is applicable to sound-receiving systems, to sound-reproducing units, like loud speakers, so that they may be adapted to emit a single frequency, electric-acoustic analyzers and filters, and to other uses.

Figure 1:
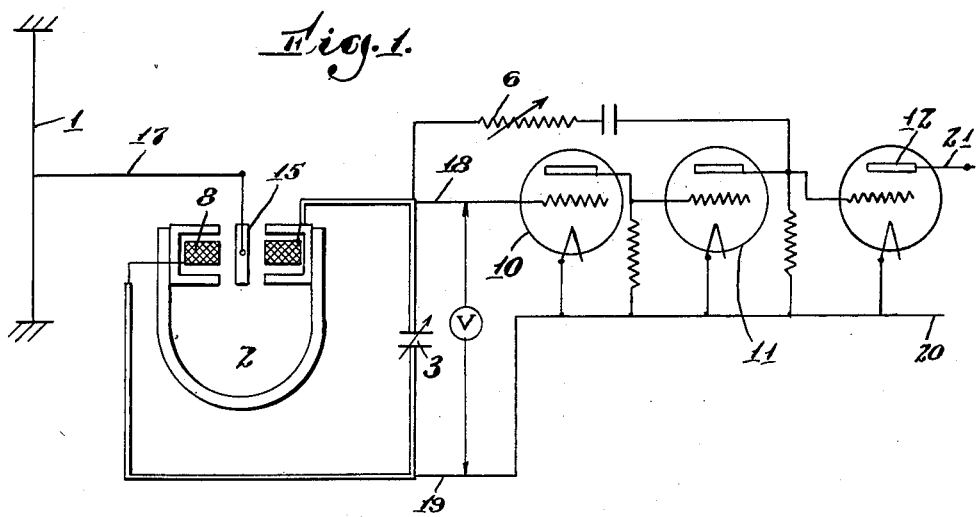
Figure 2:
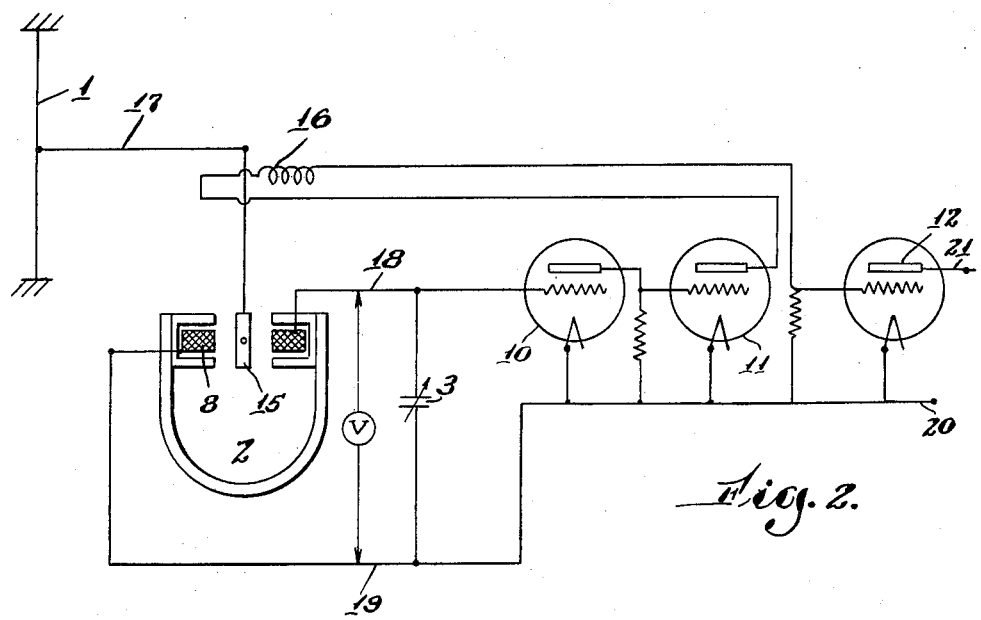
Figure 3:
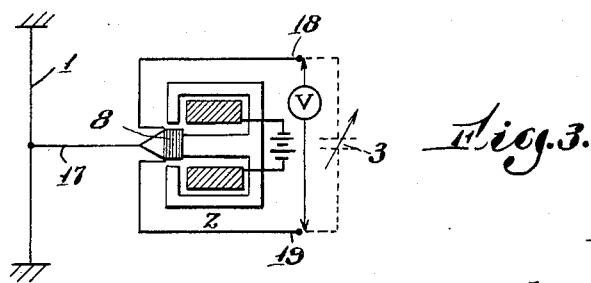

The invention will be explained in connection with the accompanying drawing, in which Fig. 1 is a diagrammatic view of apparatus and circuits constructed and arranged according to a preferred embodiment of the present invention; Fig. 2 is a similar view of a modification; and Fig. 3 is a fragmentary view of another modification.

A diaphragm 1 is shown coupled to a mechanical-electrical device 2 of any well known type. Two types are illustrated in the drawing, one an electro-magnetic converter (Figs. 1 and 2) comprising an intermediately pivoted armature 15 cooperating with a coil 8 and mechanically connected with the diaphragm at 17, and the other (Fig. 3) a moving-coil type of drive. Any other type of electro-mechanical element may be used in place of those illustrated. As ordinarily employed, these devices are supplied with electric power from a suitable source to drive the diaphragms, but the operation is reversible, and the mechanical vibrations of the diaphragm are here converted into electric energy.

The combination of the diaphragm 1 and the energy-converting element 2 ordinarily yields an acoustic-electric system that, though having resonance points determined by the resonances of the mechanical and electrical elements of the system, does not have a single, sharp resonance point above all others, unless electrically or mechanically tuned, and even then, these resonances may not be so sharp as desirable for certain types of work. For example, let it be assumed, as is usually the case with apparatus of this type, that the impedance between the points 18 and 19, looking into the element 2, is inductive. A condenser 3 may, therefore, be connected, as shown, to permit tuning to parallel resonance. This tuning, of course, since the mechanical and electrical systems are coupled together, reflects back through the diaphragm 1. For the same reason, any mechanical property of the diaphragm 1 is reflected through into the element 2. Even with such condenser tuning, however, the voltage V across the condenser terminals may not vary widely enough with a change in frequency.

According to the present invention, however, the voltage across the condenser 3 is amplified, and energy is regeneratively fed back to neutralize much of the inherent resistance which is introduced into the system by the resistance of the coil 8, through friction in the diaphragm, and in other moving mechanical elements. To this end, in the illustrated embodiment of the invention, the system is connected with a two-stage resistance-coupled amplifier 10, 11, and the regenerative feed back may be effected by means of an inductor coil 16, in the output circuit of either the tube 10 or the tube 11, coupled to the coil 8, or by means of a variable coupling resistor 6. The output of the tube 11 is, of course, designed of the proper style to be set back through the resistor 6, or coil 16, to augment the voltage upon the condenser 3. By the use of this regeneration, a given small diaphragm 1 and mechanical-electrical converting element 2 can be made to have a very selective characteristic and can be made to be very sensitive to sound waves of a given frequency. In fact, the system can be made so sensitive to sound of a given frequency that the combination may be used as an analyzer of sound waves, where the impinging waves may be of various frequencies, but where the diaphragm will respond, to all intents and purposes, to but one of these waves. The ratio of any given frequency to the resonance frequency may, in this manner, be greatly increased, sometimes as much as twenty or thirty times or more. Indeed, the increase is limited only by the uniformity of the different elements of the apparatus available and upon the permissible sensitivity.

A diaphragm or piston type of acoustic pick-up is thus provided by the use of regeneration, as described, that is far more sensitive to a given frequency and, therefore, far less sensitive to other frequencies, than is possible of attainment with very much larger, and more cumbersome, systems at present in use, and the system of the present invention is, furthermore, far more practical than present-day systems. The diaphragm will, of course, vibrate at the particular frequency, since the resistance, as used acoustically, is zero. Such a condition actually exists in an electric circuit where the resistance is completely cancelled, as by using regeneration. If the acoustic element is associated with an acoustic network where there are losses, however, it will be rendered stable, just as an electric circuit, that would otherwise oscillate, will not oscillate if it is connected in a circuit where the net resistance is positive.

The energy may be taken out of the system at terminals 20, 21 in the output circuit of a vacuum tube 12.

The principle of the present invention has also other uses, as in acoustic-wave filters. It is often as important to have non-dissipative acoustic elements in acoustic-wave filters as it is, in electric filters, to have non-dissipative circuit elements constituted, for example, of inductances and capacitances. It is possible to insert a system constructed according to the present invention in an electric-wave filter, so as to yield a dissipationless circuit at the particular frequency. If, for example, a sound wave is sent into a tube through one end to a diaphragm disposed at its other end, and if the diaphragm is tuned, in accordance with the present invention, to the frequency of the impinging wave, the tube will act upon the wave as though it were continued on instead of being terminated at the point where the diaphragm is located.

Other modifications and changes will also occur to persons skilled in the art, and all such are considered to fall within the spirit and scope of the present invention, as defined in the appended claims.

What is claimed is:

1. Apparatus of the character described comprising, in combination, means responsive to receive sound energy over a range of predetermined frequencies, means connected with the sound-energy-receiving means for converting the sound energy into electric energy, means for tuning the converting means to receive sound energy of but a single frequency within the range, and a vacuum-tube device connected with the converting means.

2. Apparatus of the character described comprising, in combination, a vibratory diaphragm responsive to receive sound energy over a range of predetermined frequencies, means connected with the diaphragm for converting the sound energy into electric energy, means for tuning the converting means to a frequency within the range, and a vacuum-tube device regeneratively connected with the converting means.

3. Apparatus of the character described comprising, in combination, a vibratory sound-energy diaphragm having a range of predetermined frequencies, vacuum-tube apparatus, means connecting the diaphragm with the apparatus and capable of reversibly converting acoustic energy into electric energy, and means for tuning the last-named means so as to reversibly convert but a single frequency within the range, whereby the radiation efficiency of the diaphragm is increased to a very large value.

4. A sound analyzer comprising, in combination, means for receiving sound energy over a range of predetermined frequencies, means connected with the sound-energy-receiving means for converting the sound energy into electric energy, a vacuum-tube device regeneratively connected with the converting means, and means for tuning the converting means to successive frequencies within the range to analyze the received sound.

5. A filter comprising, in combination, means for receiving sound energy over a range of predetermined frequencies, means connected with the sound-energy-receiving means for converting the sound energy into electric energy, a vacuum-tube device regeneratively connected with the converting means, and means for tuning the converting means to filter out all except a predetermined frequency in the range.

6. Apparatus of the character described comprising, in combination, means for sending sound energy over a range of predetermined frequencies, means connected with the sound-energy-sending means for converting electric energy into sound energy, means for tuning the converting means to a frequency within the range, whereby said frequency only will be transmitted, and a vacuum-tube device connected with the converting means.

7. Apparatus of the character described comprising, in combination, a vibratory diaphragm capable of transmitting sound energy over a predetermined range of frequencies, an accoustical-electrical converter connected with the diaphragm for converting electric energy into sound energy, means for tuning the converter to a frequency within the range, whereby said frequency only will be transmitted, and a vacuum-tube device regeneratively connected with the converter.

8. Apparatus of the character described comprising, in combination, a vibratory diaphragm capable of transmitting sound energy over a predetermined range of frequencies, means connected with the diaphragm for converting electric energy into sound energy, means for tuning the converting means to a frequency within the range, whereby said frequency only will be transmitted, and a vacuum-tube device regeneratively connected with the converting means.

9. Apparatus of the character described comprising, in combination, sound-energy means responsive to a range of predetermined frequencies, means connected with the sound-energy means for reversibly converting sound energy into electric energy, means for tuning the converting means to a frequency within the range, whereby said frequency only will be reversibly converted, and a vacuum-tube device connected with the converting means.

10. Apparatus of the character described comprising, in combination, a vibratory diaphragm responsive to sound energy over a range of predetermined frequencies, a mechanical-electrical converter connected with the diaphragm for reversibly converting sound energy into electric energy, means for tuning the converting means to a frequency within the range, and a vacuum-tube device regeneratively connected with the converter.

11. Apparatus of the character described comprising, in combination, a vibratory diaphragm responsive to sound energy over a range of predetermined frequencies, means connected with the diaphragm for reversibly converting sound energy into electric energy, means for tuning the converting means to a frequency within the range, whereby said frequency only will be reversibly converted, and a vacuum-tube device regeneratively connected with the converting means.

12. A sound analyzer comprising, in combination, sound-energy means responsive to a range of predetermined frequencies, means connected with the sound-energy means for reversibly converting the sound energy into electric energy, a vacuum-tube device regeneratively connected with the converting means, and means for tuning the converting means to successive frequencies within the range to analyze the received sound.

13. A filter comprising, in combination, sound-energy means responsive to a range of predetermined frequencies, means connected with the sound-energy means for reversibly converting the sound energy into electric energy, a vacuum-tube device regeneratively connected with the converting means, and means for tuning the converting means to filter out all except a predetermined frequency in the range.

EDWARD L. BOWLES.